United States Patent
Luft

[11] 3,799,647
[45] Mar. 26, 1974

[54] CONSTANT VISIBILITY ELECTRO-OPTIC DISPLAY

[75] Inventor: Victor Luft, Minneapolis, Minn.

[73] Assignee: Honeywell Inc., Minneapolis, Minn.

[22] Filed: May 24, 1972

[21] Appl. No.: 256,518

[52] U.S. Cl............... 350/150, 350/152, 350/157, 350/288, 40/130 C
[51] Int. Cl. ............................................. G02f 1/26
[58] Field of Search ............ 350/150, 152, 157, 13, 350/288; 40/130 C, 133 R

[56] References Cited
UNITED STATES PATENTS

| | | | |
|---|---|---|---|
| 3,501,219 | 3/1970 | Caulfield | 350/150 |
| 3,644,016 | 2/1972 | Macken | 350/150 |
| 3,502,875 | 3/1970 | Ploss et al. | 350/150 |
| 3,592,527 | 2/1971 | Conners | 350/150 |
| 3,724,938 | 4/1973 | Nepela | 350/13 |
| 2,753,763 | 7/1956 | Haines | 350/150 |
| 2,944,463 | 7/1960 | Rantsch | 350/152 |

Primary Examiner—Ronald L. Wibert
Assistant Examiner—Michael J. Tokar
Attorney, Agent, or Firm—Charles J. Ungemach; Albin Medved

[57] ABSTRACT

A display utilizing electro-optic (EO) material and having two coincident modes of operation, reflective and emissive. A partially silvered mirror reflects external ambient light and also passes light emitted from an internal source of back-lighting. The combined effects of the reflected and emitted light cause the contrast, and therefore the visibility, of the display to be relatively constant even though the ambient light conditions may be varying.

7 Claims, 1 Drawing Figure

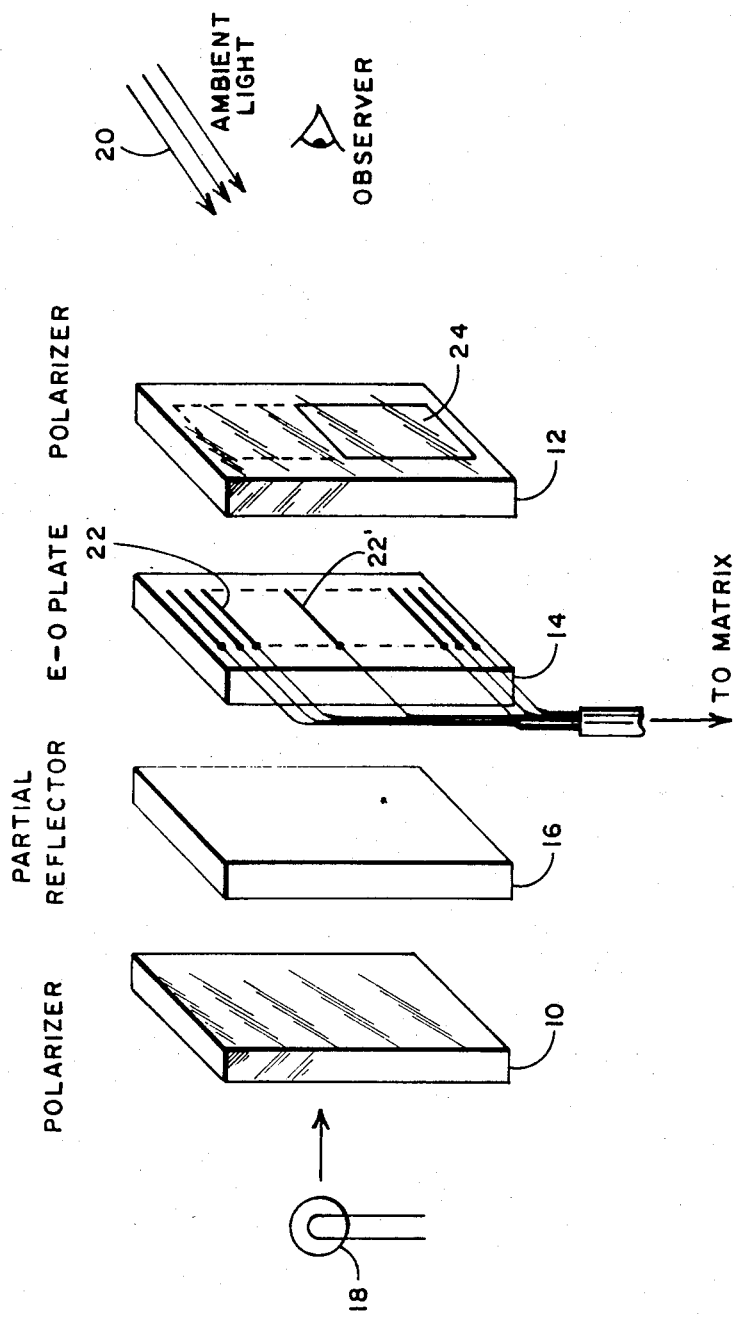

CONSTANT VISIBILITY ELECTRO-OPTIC DISPLAY

BACKGROUND OF THE INVENTION

The invention pertains to the field of displays, particularly those utilizing an EO material, such as PLZT, which is selectively energized to variably control the output indication of the display. The display comprises an electroded plate of EO material, a pair of polarizers, a partially silvered mirror, and an internal light source. The partial mirror allows two coincident modes of operation which maintains the contrast relatively constant despite varying ambient light conditions. The partial mirror reflects external ambient light and passes light emitted from the source inside the display to provide the total light used by the display. The internal light source may be said to compensate for a low ambient light condition and may be of relatively low intensity. In this way the display exhibits relatively constant visibility.

DESCRIPTION OF THE DRAWING

The display is shown in simplified form in a single drawing accompanying the specification.

DESCRIPTION OF THE PREFERRED EMBODIMENT

The display comprises a pair of circular polarizer plates 10, 12, an electroded EO plate 14, a diffuse, partially transparent, non-depolarizing reflector plate 16, and a low intensity back-lighting source 18. The EO material may be PLZT, a well-known ceramic material consisting of lead zirconate and lead titanate and doped with lanthanum. PLZT is described in the following patents owned by the Sandia Corporation: U.S. Pat. No. 3,432,773, 3,434,122, 3,499,704, and 3,512,864.

In the presence of ambient light of relatively high intensity, the display is characterized as primarily reflective whereas in the absence of ambient light or for ambient light of relatively low intensity the display is characterized as primarily emissive. The display is operative in both modes at all times but depending upon the ambient light conditions one of the modes may effectively predominate. Since the display need not emit much light in order to be seen in a low ambient light environment the necessary intensity of the back-lighting source 18 is relatively low.

In the reflective mode of operation ambient light 20 passes through circular polarizer plate 10, PLZT plate 14, and is partially reflected by reflector plate 16. PLZT plate 14 functions as a quarter wave plate in those areas that are electrically energized. In passing through the energized areas of PLZT plate 14 the circularly polarized light becomes linearly polarized. A portion of this linearly polarized light is reflected by reflector plate 16 and again passes through PLZT plate 14. In the second passage through PLZT plate 14 the reflected linearly polarized light becomes circularly polarized again and in the proper direction so that it passes back through circular polarizer plate 12 which not functions as an analyzer. Circular polarizer 12 and also circular polarizer 10 may comprise a linear polarizer in combination with a quarter wave plate. Selected areas of plate 14 are stressed by selectively applying electric potentials to electrodes 22 by means of a matrix switching arrangement and a source of potential (both not shown). For example, by properly applying potentials to electrode 22' and those below, reflected light passes through a corresponding region 24 of circular polarizer plate 10 and is visible to an observer.

Maximum contrast is provided when maximum light is reflected to the observer which occurs when PLZT plate 14 is electrically stressed so as to function as a quarter wave plate which provides quarter wave retardation. The degree of retardation is a well-known function of the electrical potential applied to the electrodes 22 and the physical thickness of plate 14.

In the emissive mode of operation, back-lighting source 18 provides the desired display contrast. Light from source 18 (the light may be of any color) passes through circular polarizer plate 10, reflector plate 16, which is semi-transparent to light, the PLZT plate 14, but is blocked by circular polarizer plate 12 unless plate 14 is electrically stressed or energized. This is because the direction or "handedness" of circular polarizer plate 10 is chosen to be opposite to that of circular polarizer plate 12. For example if circular polarizer plate 12 is "right handed," circular polarizer plate 10 is chosen to be "left handed." Therefore if PLZT plate 14 is not energized at all none of the left circularly polarized light coming from the "left handed" circular polarizer plate 10 passes through the "right handed" circular polarizer plate 12. However, if selected areas of PLZT plate 14 are energized, the left circularly polarized light from plate 10 passing through the energized areas becomes linearly polarized, a portion of the linearly polarized light will pass through the "right handed" circular polarizer plate 12. The intensity of light source 18 can be adjusted until the portion of the linearly polarized light passing through the "right handed" circular polarizer 12 is effective in maintaining the contrast of the display in a varying ambient light.

It should be understood that although the polarization has been described as circular that this is but a special case of polarization which is generally described as elliptical.

A display may also be made using parallel linear polarizers in place of circular polarizers 10, 12, in which case the display would operate in a reverse mode. That is, the display would normally appear light and become dark in selected areas depending upon which PLZT electrodes are selectively energized.

Another display may be made by replacing circular polarizer 12 with a linear polarizer. This display also would operate in a reverse mode.

Other embodiments may be apparent to those skilled in the art and fall within the scope of the invention. The invention is to be limited only by the claims.

I claim:

1. A display comprises:
   a first polarizer located toward the front of the display and exposed to ambient light;
   an electro-optic plate located behind the first polarizer and electroded so that selected areas of the plate can be electrically energized;
   a diffuse, partly transparent, non-depolarizing reflector located behind the plate;
   a second polarizer located behind the reflector; and,
   a light source located behind the second polarizer.

2. The display of claim 1 wherein the first and second polarizers are circular polarizers of opposite handedness.

3. The display of claim 1 wherein the first and second polarizers are elliptical polarizers and of opposite handedness.

4. The display of claim 1 wherein the first and second polarizers are parallel linear polarizers.

5. The display of claim 1 wherein the first polarizer is linear and the second polarizer is circular.

6. The display of claim 1 wherein the electro-optic plate is electroded with a set of parallel, line electrodes.

7. The display of claim 6 wherein the electrodes are horizontal and form a bar graph type display.

* * * * *